United States Patent Office 3,488,372
Patented Jan. 6, 1970

3,488,372
BRANCHED ORGANOPOLYSILOXANES CONTAINING TERMINAL HYDROXY GROUPS
Gerd Rossmy, Altendorf (Ruhr), and Jakob Wassermeyer, Essen, Germany; said Rossmy assignor to Th. Goldschmidt A.G., Essen, Germany
No Drawing. Filed July 22, 1964, Ser. No. 384,530
Claims priority, application Germany, July 26, 1963, G 38,311
Int. Cl. C07f 7/18; C08g 22/00; C14c 9/00
U.S. Cl. 260—448.2      19 Claims

ABSTRACT OF THE DISCLOSURE

Process for the preparation of organopolysiloxanes having terminal hydroxyl groups. An organopolysiloxane of the general formula $$R_xSiO_y(SO_4)_zX_{4-(x+2y+2z)}$$

wherein
R is monovalent hydrocarbon;
X is halogen;
$x$ has a value of from 1.5 to 2.1;
$y$ has a value of from 0.5 to 1.2;
$z$ has a value of from 0.001 to 1.2; and
$4 > (x+2y+2z) > 2$ is reacted with ammonia, primary amines or secondary amines. The reaction product thus obtained is then subjected to hydrolysis The novel compounds find utility as impregnating agents for paper and leather and in the manufacturing of polyurethane foams.

CROSS-REFERENCE TO PRIOR APPLICATIONS

This is a continuation-in-part of application Ser. No. 168,833, filed Jan. 25, 1962, now Patent No. 3,183,254, which application in turn was a continuation-in-part of application Ser. Nos. 35,138 and 35,139 filed June 10, 1960, both now abandoned, and 108,755, filed May 9, 1961, now Patent No. 3,115,512. The disclosure of column 1, line 1 to column 5, line 46 of said Patent No. 3,183,254 is specifically incorporated herein as if set forth in full.

SUMMARY OF THE INVENTION

This invention generally relates to organosilicon compounds and processes for their preparation. In particular, the invention is directed to a process for preparing organopolysiloxanes having terminal hydroxyl groups. The invention is also concerned with novel organopolysiloxanes having terminal hydroxyl groups as obtained by the inventive process.

Organosiloxanes with terminal hydroxyl groups have found many uses and applications in industry. Thus, for example, such organosiloxanes have been suggested as the active component in preparations for rendering leather hydrophobic. Further, such organosiloxanes are commonly used for imparting adhesive properties to paper products. Organosiloxanes with terminal hydroxyl groups are also excellent hardening agents for siloxane elastomers.

It is, however, generally recognized by those skilled in this particular art that the prior art polysiloxanes with terminal hydroxyl groups can be prepared with great difficulty only. This is so because the known processes leading to such polysiloxanes are very cumbersome and expensive to carry out. Another known disadvantage in the manufacture of such polysiloxanes is that the hitherto practiced procedures are not properly reproducible so that the properties and quality of the organopolysiloxanes obtained vary considerably with different batches.

Accordingly, it is a primary object of this invention to provide a process for the preparation of organopolysiloxanes having terminal hydroxyl groups which is readily reproducible and which yields such organopolysiloxanes with uniform characteristics and quality.

It is also an object of this invention to provide a process for the manufacture of organopolysiloxanes having terminal hydroxyl groups which is easy to carry out, less expensive and more economical than prior art processes.

Another object of this invention is to provide novel organopolysiloxanes having terminal hydroxyl groups.

Generally it is an object of this invention to improve on the art of organopolysiloxanes having terminal hydroxyl groups.

Briefly, and in accordance with this invention, organopolysiloxanes of the general polymer Formula I $$R_xSiO_y(SO_4)_zX_{4-(x+2y+2z)}$$

are reacted with ammonia and/or primary or secondary amines and the reaction products obtained are subsequently subjected to hydrolysis.

In Formula I, R stands for monovalent hydrocarbon, preferably methyl. A mixture of hydrocarbon groups, some of which may be substituted, is also feasible.

X stands for halogen, preferably chlorine, which, however, partially may be replaced by the group —OSO₃H;
$x$ has a value of from 1.5 to 2.1, preferably 1.85 to 2.0;
$y$ has a value of from 0.5 to 1.2, preferably 0.75 to 1.15;
$z$ has a value of from 0.0001 to 0.2, preferably 0.001 to 0.1; and
$4 > (x+2y+2z) > 2$.

It will thus be realized that in accordance with the inventive process, the polysiloxanes of Formula I are first reacted with the ammonia and/or primary or secondary amines. In this manner, siloxanes are obtained which are linked by Si-N-Si groups and/or which have end blocking

groups. These siloxanes are thereafter hydrolyzed.

A particular advantage of the inventive process resides in the fact that organosiloxanes with terminal hydroxyl groups are formed which, in regard to the polymer distribution and in regard to the distribution of different siloxane units in the polymer molecule, correspond to the statistical equilibrium, or at least very closely approach the statistical equilibrium. It will be realized that in referring to "polymer distribution which corresponds to the statistical equilibrium," the condensation tendency of those organosiloxanes with terminal hydroxyl groups has, of course not been considered. This means, in other words, that the equilibrium of the polymer distribution corresponds to that of the starting compounds, each X atom of the starting compound merely being replaced by one hydroxyl group while each SO₄ group of the starting compound is replaced by two hydroxyl groups. In referring to this polymer equilibrium, the hydroxyl group is thus being regarded as a non-reacting grouping. This has not been possible with branched siloxanes as they are known in the art while, with regard to linear siloxanes, this has only been feasible to a very limited extent and by means of very cumbersome processes.

It has surprisingly been ascertained that in the inventive process the hydrolysis proceeds quantitatively without significant condensation of the Si-OH groups to Si-O-Si groups.

According to a preferred embodiment of the inventive process, the reaction of the siloxane of Formula I with ammonia or amine is carried out in the presence of an inert solvent. This is of particular importance if the siloxane used as starting compound is of a branched nature and/or if ammonia or a primary amine is used as reactant. With branched siloxanes, it is oftentimes advantageous to use a secondary amine in order, in this manner, to maintain the molecular weight of the reaction products within certain limits. A person skilled in this art will be able easily to decide for each individual case whether it is more advantageous and economical to use the inexpensive ammonia or primary amine, and to counteract the cross linking effect of these reactants by using larger amounts of solvent or instead to use a relatively expensive secondary amine with a lesser expenditure of solvent.

Experience has demonstrated that particularly favorable results are obtained if the reaction of the polysiloxane of Formula I is carried out with amines of the general formula

wherein R is alkyl of 1 to 5 carbon atoms and R' is the same as R or is hydrogen.

It is assumed that the Si—X and the Si-O-S groups of the starting siloxane each react with one HN< group under formation of Si—N< linkages. However, if ammonia is used as the reactant, at the most two NH— groups in the molecule will react in this manner. Concerning the reactive NH groups, amounts are used which are at least equivalent to the acid groups of the starting siloxane. In many instances, however, it is of advantage to use a certain excess of NH groups. In calculating the amount to be used, it should be considered, however, that for the neutralization of the amount of acids HX and $H_2SO_4$ which is theoretically liberated, 1 or 2 moles of ammonia or amine, respectively, are also required.

The removal of these ammonium or alkylammonium salts is advantageously carried out during the subsequent hydrolysis. Preferably, an excess of water is used which is large enough to cause solution of all the salts. In order to obtain a complete reaction, it is advantageous to carry out the hydrolysis in an acid medium, preferably in aqueous solutions of weak acids. A particularly advantageous pH range is the range $\geq 3$. Acetic acid or formic acid are recommended weak acids for this purpose. It is also recommended to add the acid in such quantities that at least 1 mole of acid is available for each ammonia or amine group bound to siloxane. If necessary, stronger acids can be employed. However, in that event, special care has to be taken in order to prevent pronounced condensation of the Si-OH groups. This can be done by a suitable choice of the amount of solvent and/or by rapid neutralization of any excess acid in the system.

It will be appreciated that the polymer Formula I only represents the average composition and structure of the starting materials to be used in accordance with this invention. Examples for such starting polysiloxanes represented and embraced by the general Formula I are compounds of the Formula II

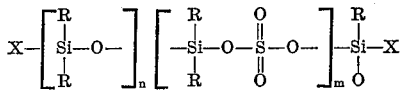

In this formula, R and X have the above meaning;
$n$ has a value of from 3 to 100, preferably from 8 to 30; and
$m$ has a value of from 0.01 to 2, preferably from 0.05 to 0.5.

It follows that not each molecule has to contain a silylsulfate group. The best value for $m$ has to be ascertained for each system.

Examples for further compounds which are embraced by the general average Formula I may be represented by the following Formula III.

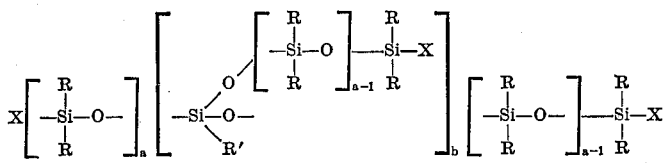

In this formula, R and X have the above-indicated meaning. A portion of the X groups, particularly 5 to 40% thereof, is replaced by

groups so that one $SO_4$ group replaces two X groups. R' stands for hydrocarbon and is preferably methyl, ethyl, vinyl or phenyl;
$a$ has a value of from 1 to 20, preferably of from 3 to 10; and
$b$ has a value of from 1 to 20, preferably of from 1 to 5.

Also, siloxanes which are derived from the siloxanes of Formula III by the replacement of two Si-X groups by one Si-O-Si group correspond to the general average Formula I and thus are embraced within the scope of the inventive starting substances.

A further group of starting compounds may be represented by the following Formula IV

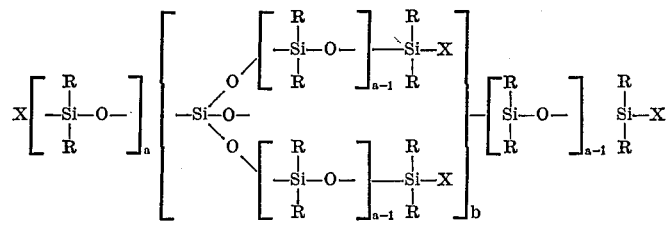

In Formula IV, R, X, $a$ and $b$ have the same meaning as in Formula III.

Polysiloxanes which are obtained by reacting compounds of Formula III in the inventive manner are novel and may be represented by the following formula:

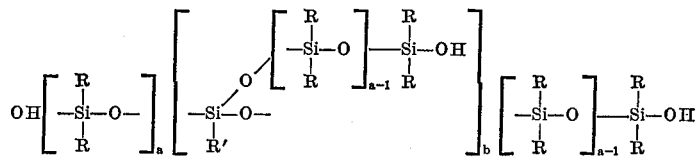

The same applies to compounds formed by the reaction of compounds of Formula IV. These novel compounds may be represented by the following formula

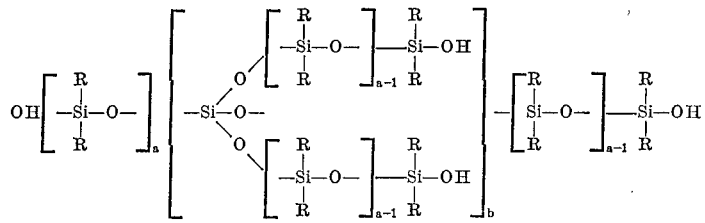

It will be noted that the novel compounds obtained from compounds of Formulas III or IV are identical with the starting compounds except that the X group has been replaced by OH. These novel compounds have extraordinary properties. Although these novel compounds generally are reasonably viscous liquids, they can readily be converted into a resin-like state by curing. They are particularly suitable as impregnation agents for paper and leather. This is so because they can be readily used for this purpose and have an excellent action in this respect. The consistency of the compounds makes it possible to dispense them through a nozzle by gas pressure and, for this reason, it is feasible to package and ship the compounds in pressurized containers. The novel compounds also find utility in the foaming of polyurethane. If used for this purpose, it is possible to obtain a pore structure of the foam which simulates the pore structure of natural sponge.

The value of z in Formula I is dependent on the constitution of the average molecule. The higher the value of z, the more rapid does the equilibration of the siloxane take place. However, the average molecular weight will then also be higher. With branched siloxanes, it is oftentimes advantageous to choose a smaller z value and consequently to equilibrate for a longer period. Gelling may take place if the z value is too high.

The invention will now be described by several examples, it being understood that these examples are given by way of illustration and not by way of limitation and that many changes may be effected without affecting in any way the scope and spirit of this invention as recited in the appended claims.

EXAMPLE I

The starting material was a siloxane which essentially can be represented by Formula III, wherein $a=6.17$, $b=3$, R and R′=CH$_3$ and X=chlorine, 20% of all chlorine atoms being replaced by SO$_4$ groups in such a manner that one

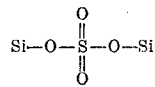

group replaces two SiCl groups. The acid content of the siloxane was $1.84\times10^{-3}$ val./g. 200 grams of this siloxane were dissolved in 200 milliliters of CH$_2$Cl$_2$. A solution of 56.5 grams of diethylamine (5% excess) in 100 milliliters of CH$_2$Cl$_2$ was added in dropwise manner to the siloxane solution. The reaction product obtained was washed twice with water and in doing so, the entire salt amount in the reaction mixture was dissolved. About 90 milliliters of CH$_2$Cl$_2$ were thereafter removed by distillation. 368.2 grams of a clear methylene chloride solution remained. This solution contained 0.22% by weight of OH and 0.88% by weight of N in the form of

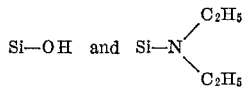

100 grams of this solution were admixed with a mixture consisting of 80 milliliters of water and 15 grams of acetic. The mixture thus obtained was stirred for five hours. After separation of the aqueous phase and distillation of about 10 milliliters of CH$_2$Cl$_2$, 92.5 grams of a clear solution remained. This solution contained 1.4% by weight of OH in the form of Si—OH groups (corresponding to 75% of the theoretical amount.) The solution was stable, without any change, for several weeks. The solution is suitable, for example, in combination with zirconium butoxide and/or titanium butoxide, as an impregnating agent for leather.

EXAMPLE II

This example was carried out with an equilibrated siloxane which in its basic or average composition corresponded to the Formula III (R and R′=CH$_3$, $a=5.41$ and $b=11$, 15% of all chlorine atoms being replaced by SO$_4$ groups; acid content upon titration $1.956\times10^{-3}$ val./g.). 711 grams of this equilibrated siloxane were dissolved in 1100 milliliters of methylene chloride. 214 grams of diethylamine were added to the solution under stirring and cooling. The precipitated salt was separated by the addition of 400 milliliters of water. Thereafter, 700 milliliters of water and subsequently 87.6 grams of acetic acid were added to the system. Upon separation of the aqueous phase, the residue was repeatedly washed with water. After removal of the methylene chloride by distillation, 690 grams of a reasonably viscous product remained. Viscosity: 427 cp. (20° C.); the OH-content (determined by the isocyanate method) was 3.57%. The theoretical amount of OH for a siloxane of Formula III with the indicated meaning of the symbols in which all chlorine atoms and SO$_4$ groups are replaced by hydroxyl groups would be 3.85%.

EXAMPLE III

The starting material was an equilibrated siloxane which in its basic structure can be represented by Formula III (R and R′=CH$_3$, $a=6.17$ and $b=3$, X=Cl, of which 15% are replaced by SO$_4$ groups). 2000 grams of this equilibrated siloxane in solution with 3000 milliliters of methylene chloride were reacted with 564 grams of diethylamine and subsequently with water-acetic acid in analogous manner as described in Example II. After processing in the manner described in Example II, 1910 grams of a siloxane having a viscosity of 215 cp. (20° C.) were obtained. The OH content of the final product was 3.45%. The theoretical amount would be 3.55% if all X groups were replaced.

EXAMPLE IV

The starting material in this example is a dimethylsiloxane having terminal chlorine groups of which 10% are substituted by SO$_4$ groups. The acid content of the siloxane was $1.793\times10^{-3}$ val./g. 500 grams of this siloxane were dissolved in 750 milliliters of methylene chloride. Thereafter, ammonia was introduced into the solution at room temperature and under stirring. The introduction of the ammonia was performed within 45 minutes until the alkaline reaction of the system. The mixture thus obtained was then left to stand for an additional 90 minutes at 40° C. The precipitated salt was separated by means of 300 milliliters of water. The methylene chloride phase was therefore stirred with 500 milliliters of water and 29.6 grams of acetic acid. Upon separation of the aqueous phase, the residue was washed twice with water and finally the methylene chloride was removed by distillation. The remaining dimethylpolysiloxane (455 grams) exhibited a viscosity of 37.2 cp. (20° C.) and had a hydroxyl group content of 3.45% by weight.

7

The siloxanes prepared according to Examples II–IV are, for example, suitable as de-foaming agents for aqueous-alcoholic systems and also as impregnating agents for textiles, paper and leather for imparting such materials with hydrophobic and adhesive properties.

While specific embodiments of the invention have been shown and described in detail to illustrate the application of the inventive principles, it will be understood that the invention may be embodied otherwise without departing from such principles.

EXAMPLE V

The starting material was an equillibrated siloxane mixture which in its basic structure can be represented by Formula III, R=CH$_3$, R'=vinyl, $a$=3, $b$=1, X=Cl, of which 12% are substituted by SO$_4$ groups. The acid content of the siloxane was determined to be 3.545×10$^{-3}$ val./g. 100 grams of this siloxane in solution with 150 milliliters of methylene chloride were mixed with 1 gram hydrazine sulfate and then reacted with 5444 grams diethylamine and subsequently with water-acetic acid in analogous manner described in Example II. 90 grams of a siloxane having a viscosity of 107 cp. at 20° C. were obtained. The OH-content was 6.27%. (Theoretical amount: 6.45%.)

EXAMPLE VI

The starting material was an equilibrated siloxane which in its basic structure can be represented by Formula IV, R=CH$_3$, $a$=6.1, X=Cl, of which 21% are substituted by SO$_4$ groups. The acid content of the siloxane was determined to be 1.993×10$^{-3}$ val./g. In analogous manner, described in Example II, 100 grams of this siloxane in solution with 150 milliliters of methylene chloride were reacted with 30.6 grams diethylamine and subsequently with 80 grams water and 12.5 grams acetic acid. After being repeatedly washed with water methylene chloride was removed from the reaction product by distillation 92 grams of a siloxane having a viscosity of 90 cp. (20° C.) and a OH-content of 3.21% (theoretical amount: 3.52%) were recovered.

What is claimed is:
1. A compound of the average formula

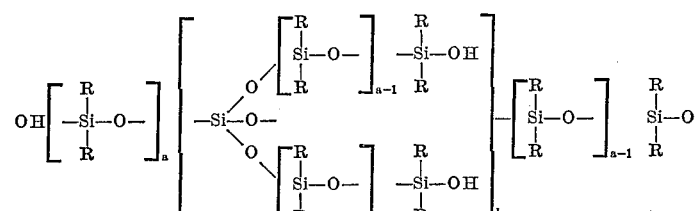

wherein R and R' stand for hydrocarbon, $a$=1 to 20 and $b$=1 to 20.

2. A compound as claimed in claim 1, wherein the majority of the R groups is methyl and R' is selected from the group consisting of methyl, ethyl, vinyl and phenyl, $a$=3 to 10 and $b$=1 to 5.

3. A compound of the average formula

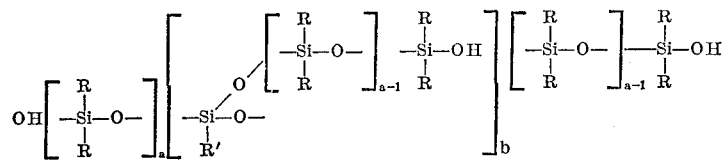

wherein R is hydrocarbon, $a$=1 to 20 and $b$=1 to 20.

8

4. A compound as claimed in claim 3, wherein the majority of the R groups stand for methyl.

5. A process for the preparation of organopolysiloxanes having terminal hydroxyl groups, which comprises reacting an organopoplysiloxane of the general formula

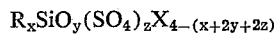

wherein

R is monovalent hydrocarbon;
X is halogen;
$x$ has a value of from 1.5 to 2.1;
$y$ has a value of from 0.5 to 1.2;
$z$ has a value of from 0.001 to 1.2; and
$4 > (x+2y+2z) > 2$ with a member selected from the group consisting of ammonia, primary amines and secondary amines, subjecting the reaction product thus obtained to hydrolysis.

6. A process as claimed in claim 5, wherein R is methyl.

7. A process as claimed in claim 5, wherein R is a mixture of monovalent hydrocarbon and substituted monovalent hydrocarbon.

8. A process as claimed in claim 5, wherein X is chlorine.

9. A process as claimed in claim 5, wherein a portion of X is constituted by the group OSO$_3$H.

10. A process as claimed in claim 5, wherein $x$ has a value of from 1.85 to 2.0.

11. A process as claimed in claim 5, wherein $y$ has a value of from 0.75 to 1.15.

12. A process as claimed in claim 5, wherein $z$ has a value of from 0.001 to 0.1.

13. A process for the preparation of organopolysiloxanes having terminal hydroxyl groups which comprises reacting organopolysiloxanes of the general formula

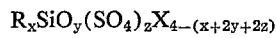

wherein R is methyl, X is chlorine, $x$ has a value of from 1.85 to 2.0; $y$ has a value of from 0.75 to 1.15; $z$ has a value of 0.001 to 0.1; and $4>(x+2y+2z)>2$, with a member selected from the group consisting of ammonia, primary amines and secondary amines, and subjecting the reaction product thus obtained to hydrolysis.

14. A process as claimed in claim 13, wherein a portion of the chlorine atoms is replaced by —OSO$_3$H.

15. A process as claimed in claim 5, wherein the reaction with said member is carried out in the presence of an inert solvent.

16. A process as claimed in claim 15, wherein the solvent is $CH_2Cl_2$.

17. A process as claimed in claim 5, wherein the hydrolysis is carried out at a pH value in the acidic range of $\geq 3$.

18. A process as claimed in claim 5, wherein the hydrolysis is carried out in an aqueous solution containing a member selected from the group consisting of acetic acid and formic acid.

19. A process as claimed in claim 5, where said member is an amine of the general formula

in which R is alkyl of from 1 to 5 carbon atoms and R' is selected from the group consisting of alkyl of from 1 to 5 carbon atoms and hydrogen.

References Cited

UNITED STATES PATENTS 3,183,254  5/1965  Rossmy et al. _____ 260—448.2

OTHER REFERENCES

Eaborn, "Organosilicon Compounds," Academic Press Inc., New York, N.Y. (1960), pp. 228, 229, 345.

TOBIAS E. LEVOW, Primary Examiner

P. F. SHAVER, Assistant Examiner

U.S. Cl. X.R.

106—13; 117—142, 154; 260—2.5, 46.5